United States Patent [19]

McKee, Jr.

[11] Patent Number: 4,884,019
[45] Date of Patent: Nov. 28, 1989

[54] ACCURATE ANALOG MEASUREMENT SYSTEM

[75] Inventor: Charles B. McKee, Jr., Fort Collins, Colo.

[73] Assignee: In-Situ, Inc., Laramie, Wyo.

[21] Appl. No.: 150,050

[22] Filed: Jan. 29, 1988

[51] Int. Cl.$^4$ .......................................... G01R 23/16
[52] U.S. Cl. ............................... 324/77 R; 324/76 R
[58] Field of Search ............. 324/58.5 C, 76 R, 76 A, 324/77 R, 77 B, 77 D, 77 G, 78 R, 79 R, 83 R

[56] References Cited

U.S. PATENT DOCUMENTS 4,365,503 12/1982 Ho et al. ........................ 324/58.5 C

Primary Examiner—Michael J. Tokar
Attorney, Agent, or Firm—Sheridan, Ross & McIntosh

[57] ABSTRACT

An accurate analog measurement system is provided for reducing the effects, characterized by variations in gain and offset, that analog signals experience when transmitted from one point to another. The accurate analog measurement includes at least one transducer having a reference signal, scaling signal and output signal. The reference signal provides the baseline relative to which the scaling and output signals are measured. Indicative of the phenomena being measured by the transducer is the output signal. The scaling signal, preferably, represents the maximum possible output signal. The present invention also includes means for forcing the reference, scaling and output signals onto a common path so that each signal experiences the same variations when transmitted to a processing station of the present invention.

23 Claims, 2 Drawing Sheets

ACCURATE ANALOG MEASUREMENT SYSTEM

FIELD OF THE INVENTION

The present invention relates to systems for reducing the distortion that a measurement signal experiences when transmitted from the location of the analog devices generating the measurement signal to a processing apparatus.

BACKGROUND OF THE INVENTION

The ability of the analog measurement systems to produce a signal that accurately represents a physical parameter is directly related to the accuracy and stability of the system components. Typically, the parameters which describe the operation of a system component vary according to certain environmental factors such as time and temperature. As a consequence of this variation the accuracy of a system component can be reduced thereby reducing the accuracy of the entire system. Since a typical analog measurement system includes several system components there can be an accumulation of errors that seriously compromises the accuracy of the system.

The prior art sought to deal with this problem by specifying component tolerances and environmental dependency coefficients that reduced system variation to an acceptable limit. For example, a parameter associated with the operation of a system component could be maintained within a tolerance of a specified value over a specified temperature range by a feedback circuit. However, analog systems which utilize such techniques are extremely complex and costly. Consequently, among the objectives of the present invention are the reduction of complex and costly circuitry to maintain the stability and accuracy of system components while at the same time producing an accurate analog measurement signal.

SUMMARY OF THE INVENTION

The present invention includes at least one transducer for measuring a physical parameter, such as temperature or pressure, and generating a signal representative of the physical parameter. Two types of transducers can be utilized in the accurate analog measurement system. The first type transducer can be characterized as having a reference signal, and as inputs, an excitation or scaling signal and the measured parameter, and as an output a measurement signal. The reference signal is a baseline relative to which both the measurement signal and the scaling signal are measured. Representative of the maximum possible measurement signal is the scaling signal. The measurement signal is indicative of the measured parameter. The first type transducer can also be characterized by an algebraic relationship wherein the measurement signal less the reference signal is proportional to both the scaling signal less the reference signal and the measured parameter. Exemplary of first type transducers are potentiometers and strain gauges. A second type transducer utilized by the accurate analog measurement system can be characterized as having a reference signal, the measured parameter as an input, and as an output a measurement signal. The second type transducer can be further characterized by an algebraic relationship wherein the measurement signal less the reference signal is proportional only to the measured parameter. Consequently, the algebraic relationship associated with the second type transducer is independent of any excitation or scaling signal. The accurate analog measurement system, however, requires that an independent scaling signal be provided when second type transducers are utilized. Thermocouples and pH probes are examples of second type transducers. Therefore, regardless of whether a first or second type transducer is utilized in the accurate analog measurement system, there is provided a reference signal, a measurement signal and a scaling signal.

Also, preferably included in the accurate analog measurement system is at least one multiplexer for sampling in a defined sequence and for a defined period of time the reference signal, measurement signal and scaling signal associated with the transducer. As each signal is sampled by the multiplexer it is outputted on a common communication line to a digital processor. Consequently, each signal traverses the same path to the digital processor and is subjected to virtually the same distortion, characterized by a gain and offset, along the path.

The accurate analog measurement system also includes, preferably, at least one digital processor which, if it has not already been converted during the communication process, converts the distorted analog signals to digital signals. Once the signals are in a digital format the digital processor can algebraically manipulate the signals to produce a virtually undistorted signal that is representative of the measured parameter. The algebraic manipulation, referred to as normalization, produces a signal that is representative of the measured parameter and virtually free from distortion.

DETAILED DESCRIPTION

Figure 1:
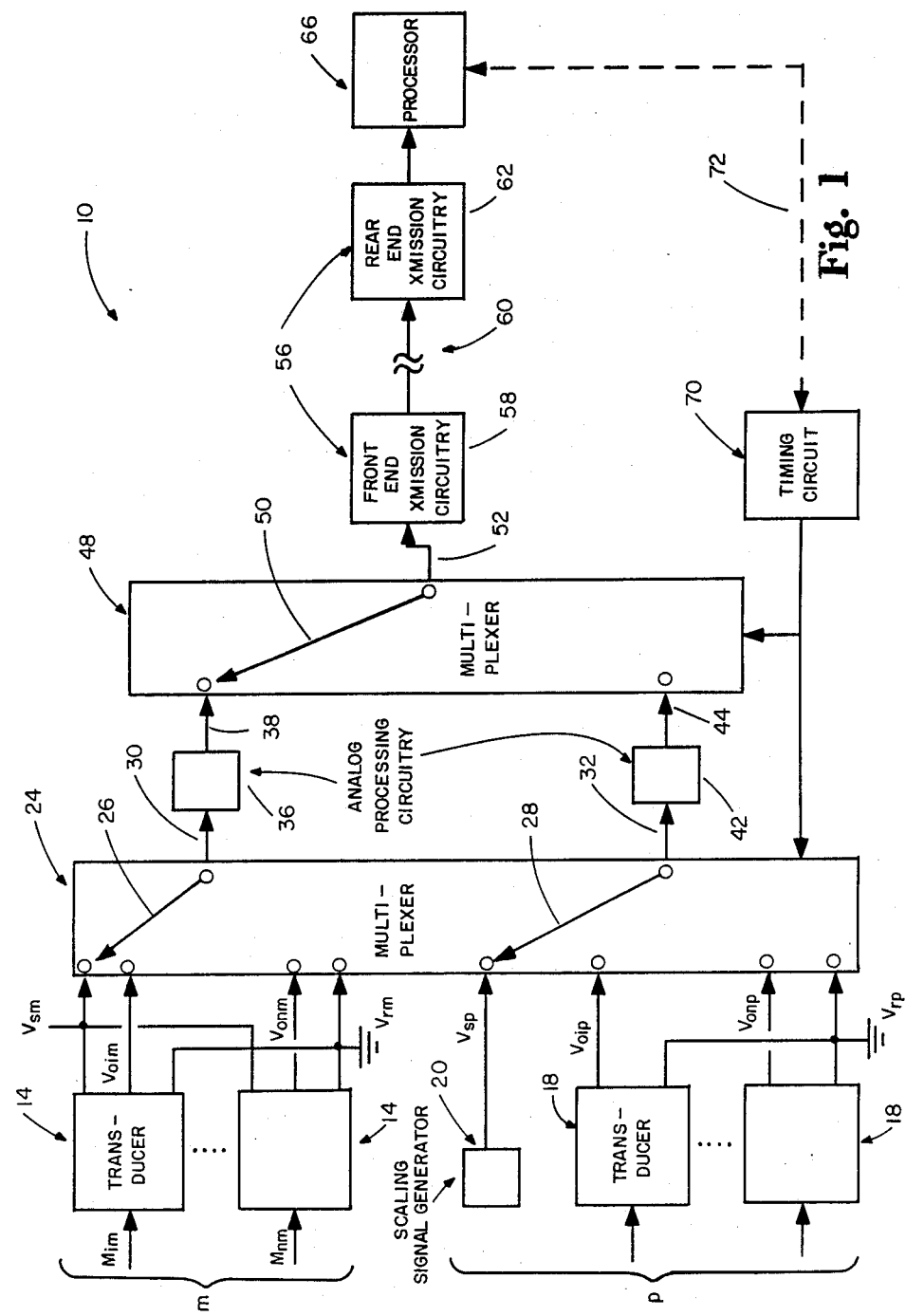
FIG. 1 is a block diagram illustrating the present invention where transducers of the types shown in FIGS. 2 and 3 are used.
Figure 3:
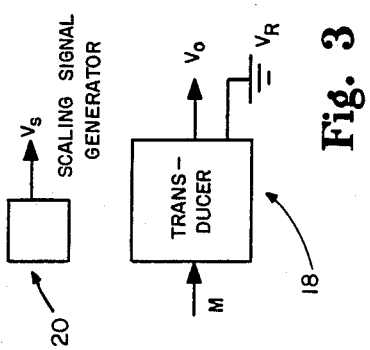
FIG. 3 is an illustration of a transducer having predetermined inputs and an output and which can be characterized by an algebraic relationship wherein the measurement signal less the reference signal is proportional only to the measured parameter.
Figure 2:
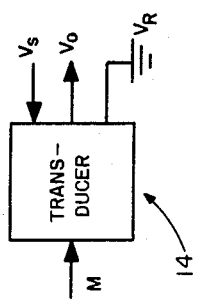
FIG. 2 is an illustration of a transducer having predetermined inputs and an output and which can be characterized by an algebraic relationship wherein the measurement signal less the reference signal is proportional to both the scaling signal less the reference signal and the measured parameter.

In accordance with the present invention and as shown in FIG. 1, an embodiment of an accurate analog measurement system 10 for reducing the distortion in measurement signals and thereby producing a more accurate measurement signal is disclosed. Included in the accurate analog measurement system 10 are two types of transducers. With reference to FIG. 2, the first type transducer 14 can be characterized as having a reference signal $V_r$, with a scaling signal $V_s$ and the measured parameter M as inputs, and a measurement signal $V_o$ as an output. Reference signal $V_r$ is a baseline relative to which both the scaling signal $V_s$ and measurement signal $V_o$ are measured. The scaling signal $V_s$ is generally, the signal driving the first type transducer 14. In the preferred embodiments, scaling signal $V_s$ represents the maximum possible measurement signal $V_o$. In an alternative embodiment, the scaling signal $V_s$ could be any known or stable value that is proportional to the signal driving the first type transducer 14. Measurement signal $V_o$ is representative of the measured parameter M. Furthermore, the first type transducer 14 can be characterized by the following algebraic relationship:

$$(V_o - V_r) = K(V_s - V_r)(M) \quad (1)$$

$$(V_o - V_r)/(V_s - V_r) = K(M)$$

Where K is a proportionality constant characteristic of the first type transducer 14. Examples of first type transducers are potentiometers and strain gauges. The second type transducers 18, as shown in FIG. 3, can be characterized as having a reference signal $V_r$, the measured parameter M as an input and as an output measurement signal $V_o$. The second type transducer 18 is also distinguished by the following algebraic relationships:

$$(V_o - V_r) = K(M) \quad (2)$$

Thermocouples and pH probes are examples of the second type transducers. As shown by equation (2) second type transducers 18 are independent of any scaling signal. However, a scaling signal is a necessary component of the present invention. Consequently, when a second type transducer 38 is used in the accurate analog measurement system 10 a scaling signal generator 20 must also be provided.

The first group of transducers m (FIG. 1) is comprised of n first type transducers 14 having as inputs measurement parameters $M_{1m}$ through $M_{nm}$, respectively, and as outputs measurement signals $V_{o1m}$ through $V_{onm}$, respectively. Furthermore, the first type transducers of group m share a common scaling signal $V_{sm}$ and reference signal $V_{rm}$. The second group p of transducers is comprised of n second type transducers 18 having as inputs measurement parameters $M_{1p}$ through $M_{np}$, respectively, and as outputs measurement signals $V_{o1p}$ through $V_{onp}$, respectively. Reference signal $V_{rp}$ is shared by all of the second type transducers 18 of group p. Included in group p is a scaling signal generator 20 which outputs a scaling signal $V_{sp}$ that will share the transmission path of all the transducers of group p. Characteristic of the accurate analog measurement system 10 is that every transducer has associated with it a reference signal, a measurement signal and a scaling signal.

Included in the accurate analog measurement system 10 is first multiplexer 24 having a first wiper arm 26 for servicing the transducers of group m and a second wiper arm 28 for processing the transducers of group p. Measurement signals $V_{o1m}$ through $V_{onm}$, common scaling signal $V_{sm}$ and the common reference signal $V_{rm}$ of group m are provided as inputs to first multiplexer 24. Likewise, the group p measurement signals $V_{o1p}$ through $V_{onp}$, common scaling signal $V_{sp}$, and common reference signal $V_{rp}$ are input to first multiplexer 24. The first multiplexer 24 samples each input signal for a defined period of time, known as a sampling interval, and in a defined sequence. The time necessary to sample all of the inputs once is known as a sequencing interval. As first wiper arm 26 samples each group m input it outputs the sampled signal onto first common line 30. Similarly, second wiper arm 28 samples and multiplexes each group p input onto second common line 32. Consequently, the reference signal, scaling signal and measurement signal for each transducer are sampled and multiplexed onto a common path.

The group m signals that are multiplexed on first common line 30 are amplified and offset by the first analog processing circuitry 36. The processing performed by first analog processing circuitry 36 may be necessary to raise the signals being input to a level where, for example, they are suitable for further transmission. The group m signals, which are still multiplexed, are then output on third common line 38. Similarly, the group p signals that are multiplexed on second common line 32 are input to second analog processing circuitry 42. After processing the multiplexed group p signals are output on fourth common line 44.

The group m signals that are multiplexed on the third common line 38 and the group p signals that are multiplexed on the fourth common line are input to the second multiplexer 48. Third wiper arm 50 of the second multiplexer 48 samples the multiplexed group m and p signals for a defined period of time and in a defined sequence. As second multiplexer 48 samples the multiplexed group m signals it outputs the sample on fifth common line 52. Similarly, the multiplexed group p signals, when sampled, are output on common line 52. Notably the reference signal, scaling signal and measurement signal of each transducer in the analog measurement system has traversed the same path since leaving multiplexer 24.

Included in the accurate analog measurement system 10 is conversion and transmission circuitry 56 typically having front end circuitry 58 and rear end circuitry 60. The multiplexed m and p signals on fifth common line 52 are input to front end circuitry 58 which may, for example, digitize and modulate the signals for radio transmission. The modulated, digitized, and multiplexed m and p signals are then transmitted across, for example, a common radio pathway 60 to rear end circuitry 62. Rear end circuitry 62 may, for example, demodulate the modulated, digitized and multiplexed m and p signals. The rear end circuitry 62 then outputs the digitized and multiplexed m and p signals to a digital processor. Most notably the reference signal, scaling signal and measurement signal associated with each transducer has traversed a common path. Consequently, the reference signal, scaling signal and measurement signal associated with each transducer has been distorted in a like fashion by the operation of the system components.

Accurate analog measurement system 10 includes a digital processor 66 which utilizes the digitized reference signal, scaling signal and measurement signal associated with each transducer to produce a virtually undistorted signal representative of the measured parameter M.

Integral to the operation of the accurate analog measurement system 10 is the timing circuit 70 which defines the sampling sequence and sampling interval to first multiplexer 24 and second multiplexer 48. In a preferred embodiment of the invention, both the digital processor 66 and the timing circuit 70, independent of any direct communication path therebetween, share the sampling sequence and sampling interval information. In this situation the timing circuit 70 starts the accurate analog system by issuing a synchronization signal, through one of the multiplexers 24, 48, which informs the digital processor of the start of a sequencing interval. Consequently, the digital processor 66 is capable of discerning when all of the necessary signals (reference signal, scaling signal and measurement signal) for a particular transducer have been received. Once all of the necessary signals for a particular transducer have been received the digital processor 66 can proceed to derive a signal representative of the measured parameter M associated with the particular transducer. Furthermore, by knowing the sampling sequence the digital processor 66 is capable of compensating for drift in the sampling period. In an alternative embodiment the timing circuit 70 is in direct contact with the digital processor 66 via communication link 72. In this embodiment timing could be altered by, for example, an operator residing at the digital processor.

METHOD OF OPERATION

Initially a sampling sequence and sampling interval are defined and programmed, in a preferred embodiment, into the digital processor 66 and the timing circuit 70. Operation of the accurate analog measurement system 10 is initiated by timing circuit 70 issuing a sychronization signal which informs the digital processor 66 of the start of a sequencing interval and initiates the defined operation in first multiplexer 24 and second multiplexer 48.

As exemplary of the operation of the accurate analog measurement system assume that the timing and sequencing are such that the signals $V_{rm}$, $V_{sm}$ and $V_{o1m}$, associated with the first transducer in group m, are sampled first and arrive first at the digital processor 66. All three signals traveled the same path, due to the multiplexing of signals, to arrive at the digital processor 66. The path is composed of system components which due to instabilities produced by environmental factors distort the signals. The path can be characterized by a gain G and an offset $V_{os1}$. Consequently, the digital signal $(D_1)$ presented to the digital processor for an arbitrary signal $V_1$ traversing the path can be characterized by the following equation:

$$D_1 = G_1 * V_1 + V_{os1} \quad (3)$$

Since $V_{rm}$, $V_{sm}$ and $V_{o1m}$ all traverse the path and necessarily experience the same gain and offset the corresponding signals arriving at the digital processor can be characterized by the following equations:

$$D_{o1m} = G_1 * V_{o1m} + V_{os1} \quad (4)$$

$$D_{sm} = G_1 * V_{sm} + V_{os1} \quad (5)$$

$$D_{rm} = G_1 * V_{rm} + V_{os1} \quad (6)$$

Since the defined sampling sequence is present in the digital processor 66 the digital processor can discern when all three signals associated with the first transducers in group m have arrived and may proceed to either store the signals for later use or to perform the following algebraic manipulation referred to as normalization:

$$\begin{aligned} N_{o1m} &= (D_{o1m} - D_{rm})/(D_{sm} - D_{rm}) \\ &= ((G_1 * V_{o1m} + V_{os1}) - (G_1 * V_{rm} + V_{os1}))/ \\ &\quad ((G_1 * V_{sm} + V_{os1}) - (G_1 * V_{rm} + V_{os1})) \\ &= (V_{o1m} - V_{rm})/(V_{sm} - V_{rm}) \\ &= K_{1m} * M_{1m} \end{aligned} \quad (7)$$

where $N_{o1m}$ is a signal representative of the measured parameter as defined in equation (1) and free of the distortion produced by the system components. A similar result is obtained for the second type transducers of group p. The normalized signal for the first transducer of group p is:

$$N_{o1p} = (K_{1p} * M_{1p})/(V_{sp} - V_{rp}) \quad (8)$$

From equation (8) it is apparent that second type transducers 18, unlike the first type transducers 14 of equation (7), are dependent on the accuracy and stability of the scaling signal $V_{sp}$ with respect to the reference signal $V_{rp}$.

With reference to equation (7), if both the reference signal $V_{rm}$ when multiplied by $G_1$, and the offset $V_{os1}$ can be characterized as insignificant when compared to other terms in equation (7), then it may not be necessary to sample $V_{rm}$ since there would be virtually no effect on the result, $N_{o1m}$.

In order for the accurate analog measurement system 10 to produce accurate measurement signals there are certain inherent constraints. Namely, the gain and offset produced by the system components must not vary substantially during the sequencing interval. Otherwise the cancellation of the gain and offset, as demonstrated in equation (7), would not be possible. Also, the gain and the offset cannot affect the signals such that the range of the system is exceeded. Furthermore, the system components must operate in a linear fashion within the defined accuracy objectives of the system.

What is claimed:

1. An accurate analog measurement apparatus, comprising:
   first means for outputting a measurement signal, said measurement signal representing a parameter measured from a physical quantity, wherein said measurement signal is subjected to a level of signal distortion while being transmitted using the apparatus;
   at least a first signal for use in reducing the signal distortion of said measurement signal, wherein said first signal is subjected to a level of signal distortion while being transmitted using the apparatus;
   second means responsive to said measurement signal and said first signal for receiving, in accordance with one of the following: simultaneously and sequentially, said measurement signal and said first signal, said second means including a common path along which said first signal and said measurement signal are transmitted wherein substantially the same level of signal distortion is experienced by said first signal and said measurement signal while being transmitted along said common path; and
   third means for receiving both of said measurement signal and said first signal from said second means via said common path, said third means including means for processing said measurement signal and said first signal to provide an output signal, whereby said output signal is representative of the measured parameter and has reduced signal distortion effects.

2. An apparatus, as claimed in claim 1, wherein:
   said first means includes means for transducing the measured parameter.

3. An apparatus, as claimed in claim 1, wherein:
   said first signal is a scaling signal.

4. An apparatus, as claimed in claim 1, further comprising:

a second signal, said second signal being a reference signal subjected to a level of signal distortion while being transmitted using the apparatus.

5. An apparatus, as claimed in claim 3, wherein:
said scaling signal is inputted to said means for transducing.

6. An apparatus, as claimed in claim 4, wherein:
said reference signal has a magnitude substantially equal to zero.

7. An apparatus, as claimed in claim 4, wherein:
each of said first signal and said second signal has a magnitude and the magnitude of said first signal is substantially greater than the magnitude of said second signal.

8. An apparatus, as claimed in claim 1, wherein:
said second means includes a first multiplexer for receiving said first signal and said measurement signal.

9. An apparatus, as claimed in claim 8, wherein:
said second means includes a second multiplexer communicating with said first multiplexer.

10. An apparatus, as claimed in claim 2, wherein:
said means for transducing includes a potentiometer.

11. An apparatus, as claimed in claim 2, wherein:
said means for transducing includes a pH probe.

12. An apparatus, as claimed in claim 9, wherein:
said second means includes analog processing means for conditioning said first signal and said measurement signal for further transmission.

13. An apparatus, as claimed in claim 12, wherein:
said analog processing means communicates with each of said first multiplexer and said second multiplexer.

14. An apparatus as claimed in claim 1, wherein:
said third means includes means for digitizing signals inputted thereto.

15. An apparatus, as claimed in claim 1, wherein:
said third means includes processing means for providing a normalized signal representative of said measured parameter using said first signal and said measurement signal.

16. An apparatus, as claimed in claim 15, wherein:
said third means includes timing means communicating with said processing means and outputting a synchronization signal for use in controlling the operation of said processing means.

17. A method for producing an accurate analog signal, comprising:
providing at least a first signal;
measuring a parameter from a physical quantity;
converting the measured parameter to a measurement signal;
transmitting said first signal to a means for processing, said first signal being subjected to signal distortion while being transmitted;
transmitting said measurement signal to said means for processing, said measurement signal being subjected to signal distortion while being transmitted, wherein said transmitting of said measurement signal is along substantially the same path as the path taken when transmitting said first signal, said first signal and said measurement signal being subject to substantially the same level of signal distortion; and
processing said first signal and said measurement signal to provide an output signal having a magnitude representative of the measured parameter while reducing signal distortion effects using said means for processing.

18. A method, as claimed in claim 17, wherein:
said first signal is a scaling signal.

19. A method, as claimed in claim 17, further comprising the step of:
providing a reference signal.

20. A method, as claimed in claim 19, wherein:
said reference signal has a magnitude and the magnitude of said reference signal is one of the following: substantially equal to zero and substantially less than the magnitude of said scaling signal.

21. A method, as claimed in claim 17, wherein:
said measurement signal is obtained using means for transducing and said first signal is a scaling signal; and
said scaling signal is inputted to said transducer means.

22. A method, as claimed in claim 17, wherein:
said step of processing includes obtaining a normalized signal representative of the measured parameter using said first signal.

23. A method, as claimed in claim 17, wherein:
said steps of transmitting said first signal and said measurement signal include transmitting each of them through multiplexer means.

* * * * *